United States Patent [19]
Yagasaki

[11] Patent Number: 5,953,455
[45] Date of Patent: *Sep. 14, 1999

[54] APPARATUS AND METHOD FOR ENCODING AND DECODING AN IMAGE

[75] Inventor: Yoichi Yagasaki, Kanagawa, Japan

[73] Assignee: Sony Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/573,997

[22] Filed: Dec. 18, 1995

[30] Foreign Application Priority Data

Dec. 19, 1994 [JP] Japan .................................... 6-334856

[51] Int. Cl.$^6$ ....................................... G06K 9/36

[52] U.S. Cl. .......................... 382/232; 382/240; 348/577; 348/650; 358/520

[58] Field of Search .................................. 382/232, 233, 382/240; 358/412, 486, 520; 364/413.07, 579; 395/148; 354/80, 49; 348/423, 511, 577, 650; 345/153

[56] References Cited

U.S. PATENT DOCUMENTS

| | | | |
|---|---|---|---|
| 4,096,523 | 6/1978 | Belmares-Sarabia et al. | 358/520 |
| 4,322,808 | 3/1982 | Weiss | 382/232 |
| 4,499,548 | 2/1985 | Beebe | 382/232 |
| 4,710,800 | 12/1987 | Fearing et al. | 348/577 |
| 4,763,186 | 8/1988 | Belmares-Sarabia et al. | 348/650 |
| 5,081,450 | 1/1992 | Lucas et al. | 382/232 |
| 5,321,521 | 6/1994 | Nomizu | 382/232 |
| 5,521,717 | 5/1996 | Maeda | 382/240 |
| 5,576,769 | 11/1996 | Lehdaro | 348/511 |

*Primary Examiner*—Jose L. Couso
*Assistant Examiner*—Anh Hong Do
*Attorney, Agent, or Firm*—Frommer Lawerence & Haug, LLP.; William S. Frommer; Dennis M. Smid

[57] ABSTRACT

An image encoding and decoding apparatus and method for providing a reference picture signal for display on a display device. Such reference picture signal may indicate a brightness change or a change in color. By observing the displayed reference picture signal, an operator can adjust one or more parameters of the display device to a desired level or levels, As a result, a picture signal may be displayed on the display device with a relatively high picture quality.

17 Claims, 4 Drawing Sheets

APPARATUS AND METHOD FOR ENCODING AND DECODING AN IMAGE

BACKGROUND OF THE INVENTION

1. Field of the Invention

The present invention relates to an image decoding apparatus, an image encoding apparatus, a recording medium, a method of transmitting a picture signal, and an image display device, more particularly to improvement of a recording medium such as video tape and video disk, an encoding apparatus for encoding a picture signal which has been recorded on the recording medium, and the decoding apparatus for decoding a picture signal which has been recorded and encoded on the recording medium, and a method of transmitting a picture signal in a digital television broadcasting, a video conference system, or the like, and the image encoding apparatus and the image decoding apparatus in said system, and the image display device of television, etc.

2. Description of the Related Art

Figure 1:
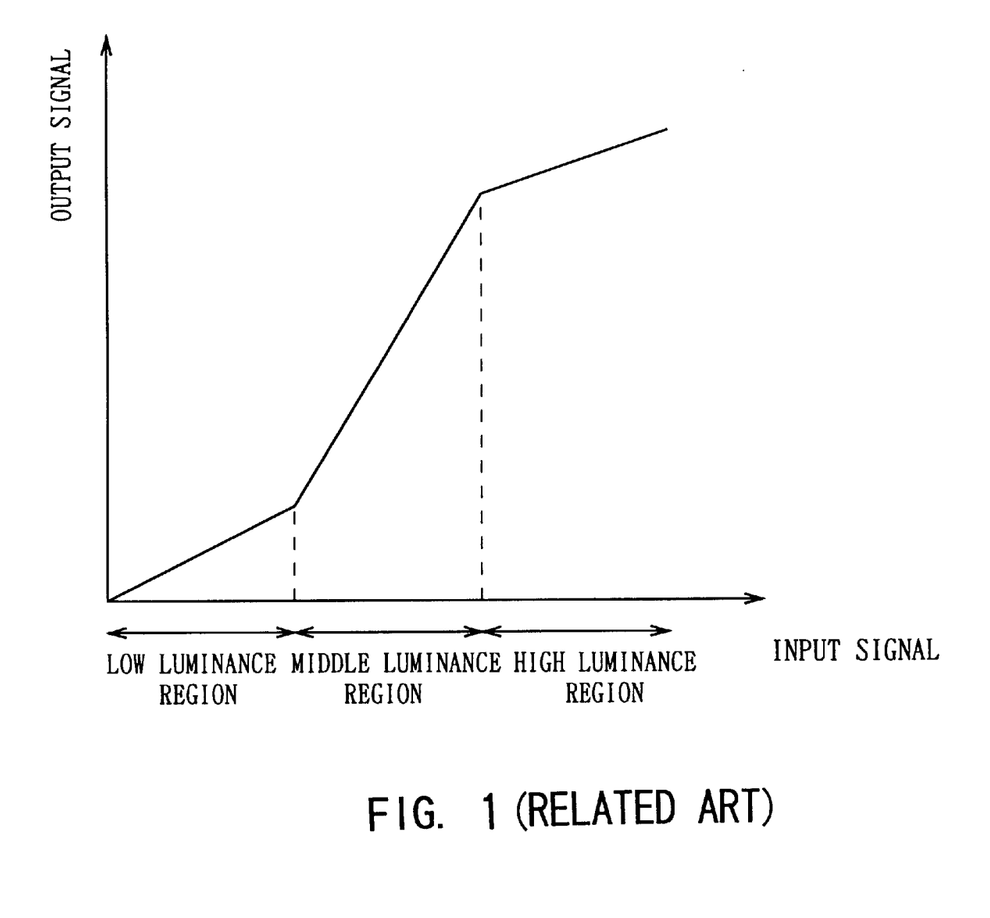
FIG. 1 is a graph representing the input-output relation in a display device by the luminance characteristics.

Heretofore, in the image decoding apparatus to decode images and the image encoding apparatus to encode images, the image to be displayed on the screen of display device depends on the individual display device For example, in the television (TV) display device, there are many cases where the contrast emphasizing mode to emphasize the contrast is equipped in order to obtain subjectively sharp picture quality. More specifically, as shown in FIG. 1, tones in the low luminance area and high luminance area are compressed (encoded) and tone in the medium luminance area which is viewed by human eye comfortably is enlarged. In the medium luminance area, the contrast between the dark part and the bright part increases and thus the contrast is emphasized and subjectively clear picture quality can be obtained.

However, the degree of compression of tones of output signal in the low luminance area, medium luminance area and high luminance area, ie., the degree of slope in each luminance area of output signal, as shown in FIG. 1, differs according to the type of televisions (TVs). Accordingly, there has been a problem that if the different types of televisions (TVs) were used for the same image, the same image would not be displayed on the display device and the exact image intended by the producer would not be expressed.

Furthermore, in the display device in which contrast emphasizing mode was equipped as described above, if the decoded image deteriorated by the compression (encoding) was displayed, deterioration of picture quality was emphasized and false contours became apparent and thus created a problem. This problem can be solved by displaying the image using the mode in which deterioration of picture quality would not be conspicuous, not using the mode like the contrast emphasizing mode which emphasizes the deterioration of picture quality.

However, in various modes of the display device, there has been no index to judge which mode is the mode that would not highlight the deterioration of picture quality. This applies to the case of controlling various types of parameters (such as picture and sharpness) without setting the mode.

SUMMARY OF THE INVENTION

In view of the foregoing, an object of the present invention is to provide an image decoding apparatus and method thereof, an image encoding apparatus and method thereof, a recording medium, a method of transmitting picture signals, and a picture display device which are capable of setting the display condition of displaying means to the display condition in which deterioration of picture quality would not be easily seen.

The foregoing object and other objects of the present invention have been achieved by the provision of an apparatus for decoding a picture signal encoded by a predetermined encoding method, said apparatus comprising: receiving means for receiving an encoded picture signal which is encoded by means of a predetermined encoding method; reference picture signal generating means for generating a reference picture signal to control the display condition of a decoded picture signal; selecting means for selecting said received encoded picture signal and said reference picture signal at a predetermined timing; decoding means for decoding said encoded picture signal and said reference picture signal from said selecting means by a decoding method corresponding to said encoding method; and displaying means for displaying said decoded picture signal after said display condition is controlled depending on said decoded reference picture signal. Thereby, the present invention can be realized an image decoding apparatus in which the display condition of the displaying means can be set to the display condition in which the deterioration of picture quality would not be easily seen.

Further, the foregoing object and other objects of the present invention have been achieved by the provision of an apparatus for decoding a picture signal encoded by a predetermined encoding method, said apparatus comprising: receiving means for receiving an encoded picture signal which is encoded by a predetermined encoding method; decoding means for decoding said received encoded picture signal by means of a decoding method corresponding to said encoding method; reference picture signal generating means for generating a reference picture signal to control the display condition of the decoded picture signal; selecting means for selecting said decoded picture signal and said reference picture signal at a predetermined timing; and displaying means for displaying said decoded picture signal after said display condition is controlled depending on said reference picture signal. Thereby, the present invention can be realized an image decoding apparatus in which the display condition of the displaying means can be set to the display condition in which the deterioration of picture quality would not be easily seen.

Further, the foregoing object and other objects of the present invention have been achieved by the provision of an apparatus for encoding an inputted picture signal by a predetermined encoding method, said apparatus comprising: receiving means for receiving a picture signal; reference picture signal generating means for generating a reference picture signal to control the display condition of a picture signal; selecting means for selecting said received picture signal and said reference picture signal at a predetermined timing; and encoding means for encoding said picture signal and said reference picture signal from said selecting means by said encoding method. Thereby, the present invention can be realized an image encoding apparatus in which the display condition of the displaying means can be set to the display condition in which the deterioration of picture quality would not be easily seen.

Further, the foregoing object and other objects of the present invention have been achieved by the provision of an apparatus for encoding an inputted picture signal by a predetermined encoding method, said apparatus comprising: receiving means for receiving a picture signal; encoding means for encoding said received picture signal by means of said encoding method; reference picture signal generating means for generating a reference picture signal to control the display condition of a picture signal; and selecting means for selecting said encoded picture signal and said reference picture signal at a predetermined timing. Thereby, the present invention can be realized an image encoding apparatus in which the display condition of the displaying means can be set to the display condition in which the deterioration of picture quality would not be easily seen.

Further, the foregoing object and other objects of the present invention have been achieved by the provision of a method for transmitting a picture signal encoded by a predetermined encoding method, said method comprising the steps of receiving a picture signal; generating a reference picture signal to control the display condition of a picture signal; selecting said received picture signal and said reference picture signal at a predetermined timing; encoding said picture signal and said reference picture signal by said encoding method; and selectively transmitting said encoded picture signal and said encoded reference picture signal. Thereby, the present invention can be realized an image signal transmission method in which the display condition of the displaying means can be set to the display condition in which the deterioration of picture quality would not be easily seen.

Furthers the foregoing object and other objects of the present invention have been achieved by the provision of a recording medium to be recorded a picture signal encoded by a predetermined encoding method thereon, wherein an encoded picture signal and an encoded reference picture signal to control the display condition of a picture signal are recorded to a predetermined position on said recording medium, respectively; and said reference picture signal is used to control the display condition of a picture signal before the decoded picture signal is displayed. Thereby, the present invention can be realized a recording medium in which the display condition of the displaying means can be set to the display condition in which the deterioration of picture quality would not be easily seen.

Further, the foregoing object and other objects of the present invention have been achieved by the provision of a device for displaying a received picture signal, said device comprising, receiving means for receiving an encoded picture signal which is encoded by means of a predetermined encoding method; decoding means for decoding said encoded picture signal by means of a decoding method corresponding to said predetermined encoding method; displaying means having control means for controlling luminance change and/or color change, for displaying said decoded picture signal; and reference picture signal generating means for generating a reference picture signal to control the display condition of said encoded picture signal which is encoded by said predetermined encoding method. Thereby, the present invention can be realized an image display device in which the display condition of the displaying means can be set to the display condition in which the deterioration of picture quality would not be easily seen.

Further, the foregoing object and other objects of the present invention have been achieved by the provision of a method for decoding a picture signal encoded by a predetermined encoding method, said method comprising the steps of: receiving an encoded picture signal which is encoded by means of a predetermined encoding method; generating a reference picture signal to control the display condition of the decoded picture signal; selecting said received encoded picture signal and said reference picture signal at a predetermined timing; decoding said encoded picture signal and said reference picture signal from said selection step by a decoding method corresponding to said encoding method; and displaying said decoded picture signal after said display condition is controlled depending on said decoded reference picture signal. Thereby, the present invention can be realized an image decoding method in which the display condition of the displaying means can be set to the display condition in which the deterioration of picture quality would not be easily seen.

Further, the foregoing object and other objects of the present invention have been achieved by the provision of a method for decoding a picture signal encoded by a predetermined encoding method, said method comprising the steps of: receiving an encoded picture signal which is encoded by a predetermined encoding method; decoding said received encoded picture signal by means of a decoding method corresponding to said encoding method; generating a reference picture signal to control the display condition of the decoded picture signal; selecting said decoded picture signal and said reference picture signal at a predetermined timing; and displaying said decoded picture signal after said display condition is controlled depending on said reference picture signal. Thereby, the present invention can be realized an image decoding method in which the display condition of the displaying means can be set to the display condition in which the deterioration of picture quality would not be easily seen.

Further, the foregoing object and other objects of the present invention have been achieved by the provision of a method for encoding an inputted picture signal by a predetermined encoding method, said method comprising the steps of: receiving a picture signal; generating a reference picture signal to control the display condition of a picture signal; selecting said received picture signal and said reference picture signal at a predetermined timing; and encoding said picture signal and said reference picture signal from said selection step by said encoding method. Thereby, the present invention can be realized an image encoding method in which the display condition of the displaying means can be set to the display condition in which the deterioration of picture quality would not be easily seen.

Further, the foregoing object and other objects of the present invention have been achieved by the provision of a method for encoding an inputted picture signal by a predetermined encoding method, said method comprising the steps of: receiving a picture signal; encoding said received picture signal by means of said encoding method; generating a reference picture signal to control the display condition of a picture signal; and selecting said encoded picture signal and said reference picture signal at a predetermined timing. Thereby, the present invention can be realized an image encoding method in which the display condition of the displaying means can be set to the display condition in which the deterioration of picture quality would not be easily seen.

The nature, principle and utility of the invention will become more apparent from the following detailed description when read in conjunction with the accompanying drawings in which like parts are designated by like reference numerals or characters

DETAILED DESCRIPTION OF THE EMBODIMENT

Preferred embodiments of the present invention will be described with reference to the accompanying drawings.

Figure 2:
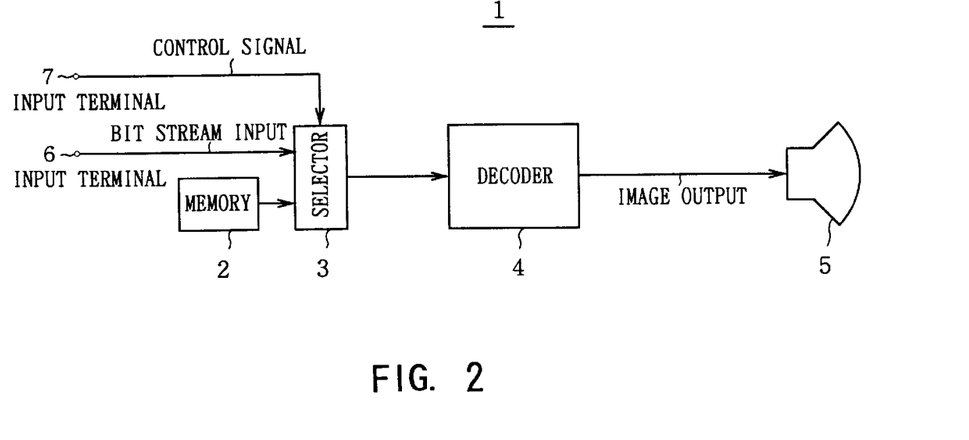
FIG. 2 is a block diagram showing the construction of an image decoding apparatus according to the embodiment of the present invention.

FIG. 2 is a block diagram showing the construction of an image decoding apparatus 1 according to the embodiment of the present invention Referring to FIG. 2, the image decoding apparatus 1 is composed of a memory 2 which stores a picture signal to control the conspicuous deteriorating of picture quality (hereinafter referred to as reference picture signal), an input terminal 6 to be inputted a compressed picture signal (bit stream) which has been compressed (encoded) by a predetermined encoding method (eg. MPEG or the like), a selector 3 for selecting the compressed picture signal (bit stream) inputted to the input terminal 6 or the reference picture signal from the memory 2, a decoder 4 which outputs the decoded image upon decoding the signal selected by the selector 3, and a television (TV) or monitor 5 equipped with display modes and various parameters (picture and sharpness, etc), and for displaying the decoded image as an output image. The reference picture signal is stored in the memory 2 compressed by the same encoding method as that of the encoding method used in case of compressing the picture signal.

In the image decoding apparatus 1, for example, if the user demands to control the display condition of the monitor 5 from the outside (by a control knob and a remote controller), a control signal is inputted from an input terminal 7 and the inputted control signal is inputted to the selector 3. The selector 3 reads out a reference picture signal from the memory 2 corresponding to this control signal at predetermined timing and outputs the reference picture signal to a decoder 4. The decoder 4 decodes this reference picture signal and outputs this to a monitor 5 as the decoded signal. Here the decoder 4 decodes the compressed picture signal and the reference picture signal by means of a decoding method corresponding to the encoding method used in the case of encoding the picture signal and the reference picture signal.

Figure 3:
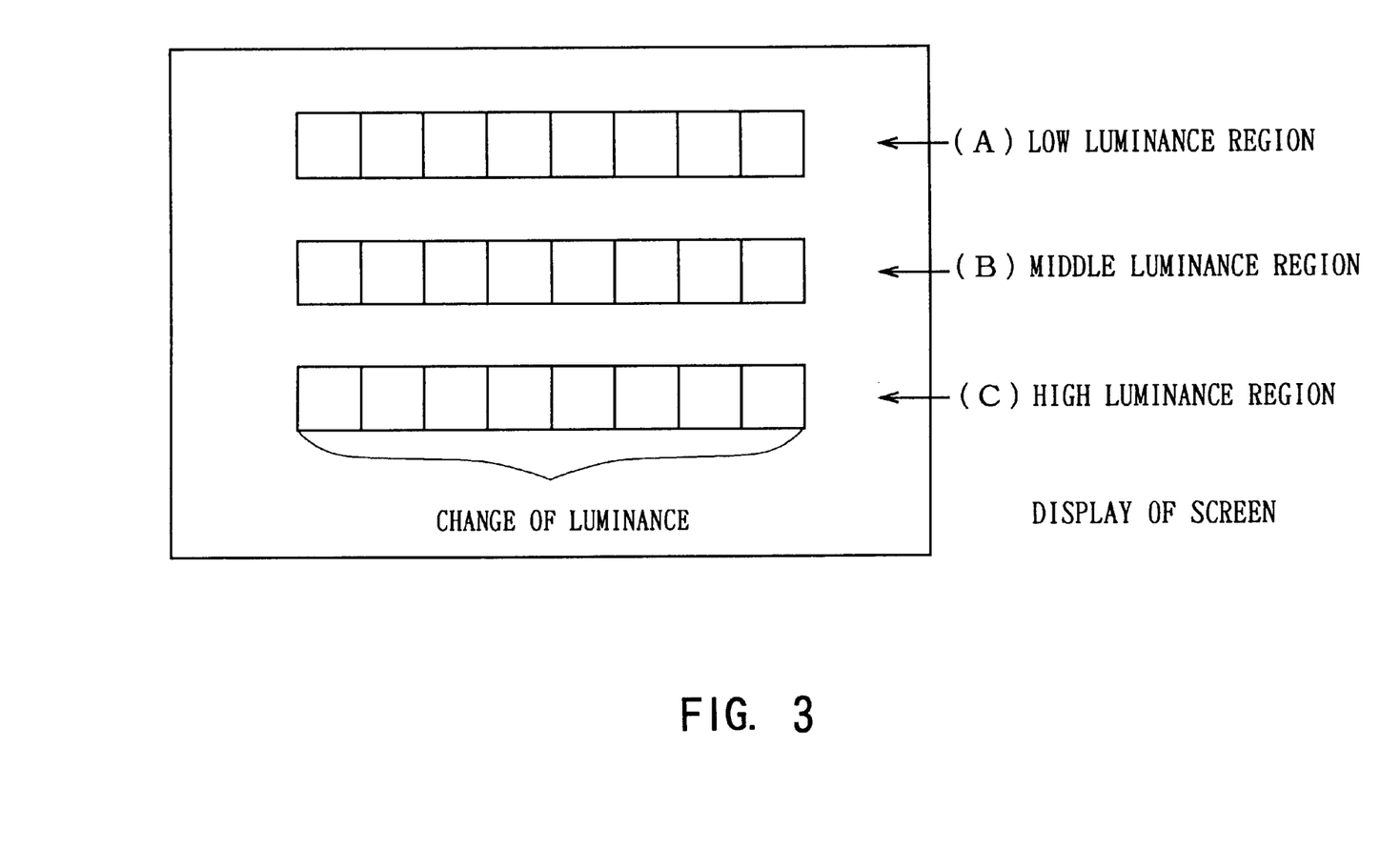
FIG. 3 is a schematic diagram showing the display content in case of showing the reference picture signal to control the apparent deterioration of picture quality on the monitor.

The reference picture signal, as shown in FIG. 3 for example, is a picture signal to display the brightness change visually by dividing the luminance area into three; low luminance range (A), medium luminance range (B) and high luminance range (C). The user judges that the present mode or setting of the monitor 5 could display what degree of tone. For example, if the present mode is the contrast emphasizing mode described above, tones of the low luminance area (A) and high luminance area (C) would be compressed and the phased brightness change become inconspicuous and the tone of the medium luminance area (B) is enlarged and the brightness change becomes conspicuous.

Thus, in the case where the image is viewed differently in the low luminance area (A), high luminance area (C) and medium luminance area (B), deterioration of picture quality due to the compression is conspicuous and therefore it is not proper as the display mode of decoded image. More specifically, when the image shown in FIG. 3 is displayed on the monitor 5, the user selects the mode of the monitor 5 or controls various parameters such as picture and sharpness in order that tones of the low luminance area (A), medium luminance area (B) and high luminance area (C) change uniformly, and sets the display condition of the monitor 5 to the display condition in which deterioration of picture quality would not be conspicuous.

As described above, the image decoding apparatus 1 according to the present invention selects the reference picture signal which is encoded by the same encoding method as that of the picture signal, and for controlling the display condition of the monitor 5 to display the picture signal at predetermined timing, and decodes the selected reference picture signal in the decoder 4. In the case of displaying the picture signal on the monitor 5, after the display condition of the monitor 5 is controlled depending on the decoded reference picture signal, the picture signal decoded in the decoder 4 is displayed on the monitor 5.

According to the foregoing construction, since the present invention selects the reference picture signal for controlling the display condition of monitor 5 by the selector 3 at predetermined timing and displays it on the monitor 5, and selects the mode of the monitor 5 or controls parameters in order that the tone of each brightness area changes uniformly, the display condition of the monitor 5 can be set to the display condition in which the deterioration of picture quality due to the picture signal compression would not be easily seen.

Figure 4:
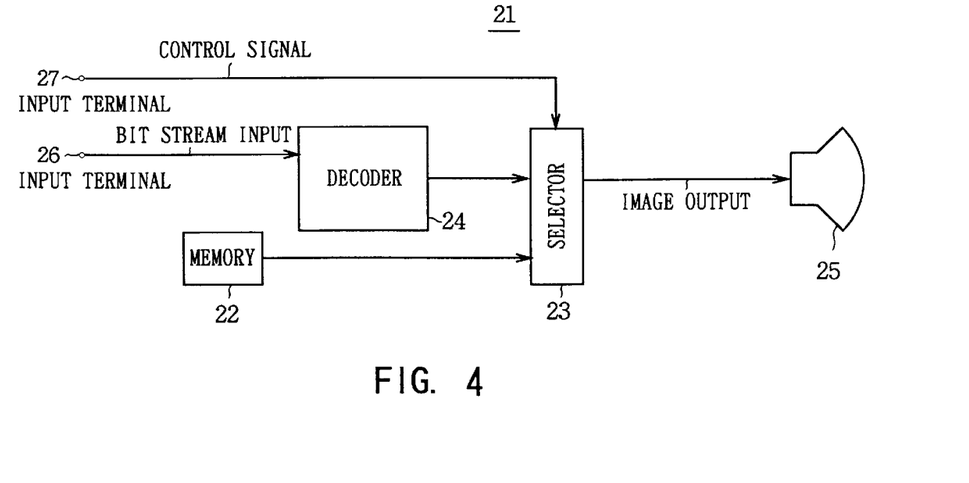
FIG. 4 is a block diagram showing the construction of an image decoding apparatus according to another embodiment of the present invention.

FIG. 4 is a block diagram showing the construction of an image decoding apparatus 21 according to another embodiment of the present invention. Referring to FIG. 4, the image decoding apparatus 21 is composed of a memory 22 which stores a picture signal to control the conspicuous deteriorating of picture quality (hereinafter referred to as reference picture signal), an input terminal 26 to be inputted a compressed picture signal (bit stream) which has been compressed (encoded) by a predetermined encoding method (eg. MPEG or the like), a decoder 24 for decoding the compressed picture signal (bit stream) which is inputted to the input terminal 26 and for outputting a decoded image, a selector 23 for selecting the decoded image from the decoder 24 or the reference picture signal from the memory 22, and a television (TV) or monitor 25 equipped with display modes and various parameters (picture and sharpness, etc), and for displaying the selected signal in the selector 23 as an output image. In the memory 22, the reference picture signal which is not compressed is stored.

In the image decoding apparatus 21, for example, if the user demands to control the display condition of the monitor 25 from the outside (by a control knob and a remote controller), a control signal is inputted from an input terminal 27 and the inputted control signal is inputted to the selector 23. The selector 23 reads out a reference picture signal from the memory 22 corresponding to this control signal at predetermined timing and outputs the reference picture signal to the monitor 25.

The reference picture signal, as shown in FIG. 3 for example, is a picture signal to display the brightness change visually by dividing the luminance area into three; low luminance range (A), medium luminance range (B) and high luminance range (C). The user judges that the present mode or setting of the monitor 25 could display what degree of tone. For example, if the present mode is the contrast emphasizing mode described above, tones of the low luminance area (A) and high luminance area (C) would be compressed and the phased brightness change become inconspicuous and the tone of the medium luminance area (B) is enlarged and the brightness change becomes conspicuous.

Thus, in the case where the image is viewed differently in the low luminance area (A), high luminance area (C) and medium luminance area (B), deterioration of picture quality due to the compression is conspicuous and therefore it is not proper as the display mode of decoded image More specifically, when the image shown in FIG. 3 is displayed on the monitor 25, the user selects the mode of the monitor 25 or controls various parameters such as picture and sharpness in order that tones of the low luminance area (A), medium luminance area (B) and high luminance area (C) change uniformly, and sets the display condition of the monitor 25 to the display condition in which deterioration of picture quality would not be conspicuous.

As described above, the image decoding apparatus 21 according to the present invention selects the reference picture signal to control the display condition of the monitor 25 on which the decoded picture signal is displayed at predetermined timing and supplies the selected reference picture signal to the monitor 25. In the case of displaying the picture signal on the monitor 25, after the display condition of the monitor 25 is controlled depending on the reference picture signal from the memory 22, the picture signal decoded in the decoder 24 is displayed on the monitor 25.

According to the foregoing construction, since the present invention selects the reference picture signal for controlling the display condition of the monitor 25 by the selector 23 at predetermined timing and displays it on the monitor 25, and selects the mode of the monitor 25 or controls parameters in order that the tone of each brightness area changes uniformly, the display condition of the monitor 25 can be set to the display condition in which the deterioration of picture quality due to the picture signal compression would not be easily seen.

Figure 5:
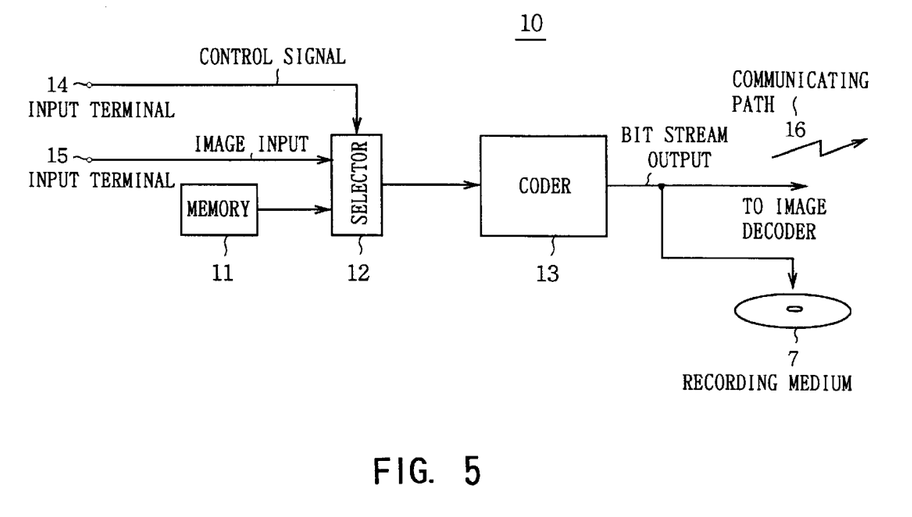
FIG. 5 is a block diagram showing the construction of an image encoding apparatus according to the embodiment of the present invention.

FIG. 5 is a block diagram showing the construction of an image encoding apparatus 10 according to the embodiment of the present invention. Referring to FIG. 5, the image encoding apparatus 10 generates the reference picture signal which controls the apparent deteriorating of picture quality and sets the display condition of a monitor to the display condition in which the deterioration of picture quality would not be easily seen. In a memory 11 in the image encoding apparatus, the reference picture signal to show the brightness change visually as shown in FIG. 3 is stored. A picture signal is inputted to an input terminal 15, and the inputted picture signal is inputted to a selector 12.

In the case where the user demands to control the monitor display condition (not shown) from the outside (by a control knob and a remote controller), the reference picture signal is added to the head of the encoded picture signal. More specifically, when the request from the outside by the user comes in, the request is supplied to the image encoding apparatus 10 as a control signal. Then, the control signal is inputted to the input terminal 14 and the inputted signal from the input terminal 14 is inputted to the selector 12. The selector 12 reads out the reference picture signal from the memory 11 at predetermined timing responding to this control signal and outputs it to the encoder 13. The encoder 13 encodes this reference picture signal and also encodes the picture signal inputted to the selector 12, and adds the reference picture signal to the head of the encoded picture signal and outputs it.

In the image decoding apparatus (not shown), the picture signal to which this reference picture signal is added is decoded and outputted to the monitor, and an image shown in FIG. 3 is displayed on the monitor. The user judges that the present mode or the setting of the monitor can display the tone of what degree More specifically, the user selects the mode of the monitor or controls various parameters in order that the tones of the low brightness area (A), medium brightness area (3) and high brightness area (C) of the image shown in FIG. 3, change uniformly and sets the display condition of the monitor to the display condition in which the deterioration of picture quality would not be seen easily.

According to the foregoing construction, the image encoding apparatus 10 according to the present invention encodes the reference picture signal read out from the memory 11 at predetermined timing and encodes the picture signal to be displayed on the monitor by means of the predetermined encoding method in the encoder 13. Thereafter, in the case of displaying the encoded picture signal on the monitor, the encoded reference picture signal and picture signal are decoded, and after controlling the display condition of the monitor depending on the decoded reference picture signal, the decoded picture signal is displayed on the monitor.

According to the foregoing construction, since the present invention selects the reference picture signal for controlling the apparent deterioration of image at the predetermined timing by the selector 12 and encodes the selected reference picture signal by the encoder 13, and adds the reference picture signal to the head of the picture signal encoded in the encoder 13 and outputs it. Then, the present invention decodes this reference picture signal at the decoder and displays on the monitor, and selects the mode of the monitor or controls various parameters in order that the tones of each brightness area change uniformly, the display condition of the monitor can be set to the display condition in which the deterioration of picture quality due to the picture signal compression would not be easily seen.

Figure 6:
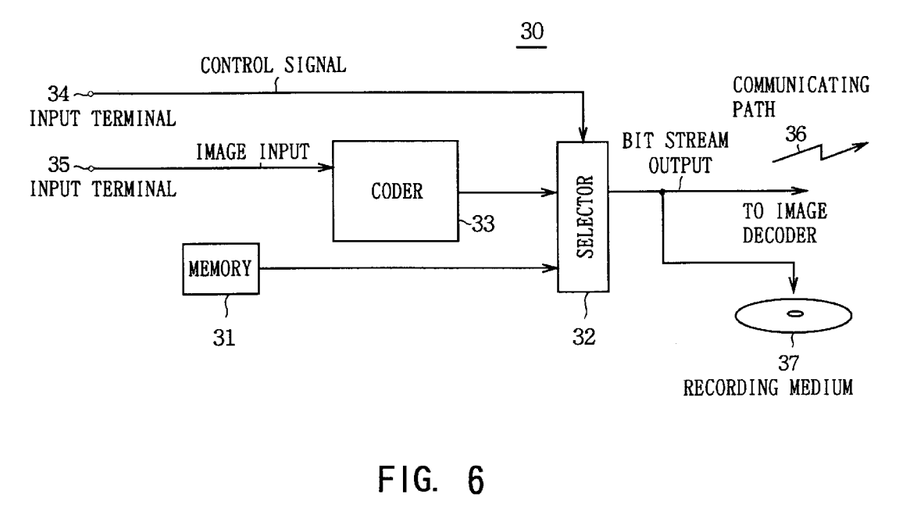
FIG. 6 is a block diagram showing the construction of an image encoding apparatus according to another embodiment of the present invention

FIG. 6 is a block diagram showing the construction of an image encoding apparatus 30 according to another embodiment of the present invention. Referring to FIG. 6, the image encoding apparatus 30 generates the reference picture signal which controls the apparent deteriorating of picture quality and sets the display condition of a monitor to the display condition in which the deterioration of picture quality would not be easily seen. In a memory 31 in the image encoding apparatus 30, the reference picture signal to show the brightness change visually as shown in FIG. 3 is stored, this reference picture signal is encoded by means of the same encoding method as the method where the picture signal is encoded. The picture signal is inputted to an input terminal 35, and the inputted picture signal is inputted to an encoder 33 to be encoded. Then, the encoded picture signal which is the output signal of the encoder 33 is inputted to a selector 32.

In the case where the user demands to control the monitor display condition (not shown) from the outside (by a control knob and a remote controller), the reference picture signal is added to the head of the encoded picture signal. More specifically, when the request from the outside by the user comes in, the request is supplied to the image encoding apparatus 30 as a control signal. Then, the control signal is inputted to the input terminal 34 and the inputted signal from the input terminal 14 is inputted to the selector 32. The selector 32 reads out the reference picture signal from the memory 31 at predetermined timing corresponding to this control signal and outputs it. The selector 32 adds the reference picture signal to the head of the picture signal encoded by the encoder 33 and outputs it.

In the image decoding apparatus (not shown), the picture signal to which this reference picture signal is added is decoded and outputted to the monitor, and an image shown in FIG. 3 is displayed on the monitor. The user judges that the present mode or the setting of the monitor can display the tone of what degree. More specifically, the user selects the mode of the monitor or controls various parameters in order that the tones of the low brightness area (A), medium brightness area (B) and high brightness area (C) of the image shown in FIG. 3, change uniformly and sets the display condition of the monitor to the display condition in which the deterioration of picture quality would not be seen easily.

According to the foregoing construction, the image encoding apparatus 30 according to the present invention encodes the picture signal to be displayed on the monitor by a predetermined encoding method, and adds the encoded reference picture signal which is read out from the memory 22 to the encoded picture signal at predetermined timing and outputs it. Thereafter, in the case of displaying the encoded picture signal on the monitor, the encoded reference picture signal and picture signal are decoded, and after controlling the display condition of the monitor depending on the decoded reference picture signal, the decoded picture signal is displayed on the monitor.

According to the foregoing construction, since the present invention selects the reference picture signal for controlling the apparent deterioration of image at the predetermined timing by the selector 32 and outputs it, and adds the reference picture signal to the head of the picture signal encoded in the encoder 33 and outputs it. Then, the present invention decodes this reference picture signal at the decoder and displays on the monitor, and selects the mode of the monitor or controls various parameters in order that the tones of each brightness area change uniformly, the display condition of the monitor can be set to the display condition in which the deterioration of picture quality due to the picture signal compression would not be easily seen.

Furthermore, in the embodiment described above, the reference picture signal is generated at the image decoding apparatus 1, 21 or the image encoding apparatus 10, 30. However, the present invention is not only limited to this, but as shown in FIGS. 5 and 6, the encoded picture signal generated by the image encoding apparatus 10, 30 which is encoded by means of the specified encoding method, and the reference picture signal encoded by the same encoding method as that of the encoding method applied to said picture signal may be transmitted on the communication channel 16, 36. In this case, when the encoded picture signal is displayed on the monitor, the decoding unit decodes the reference picture signal and picture signal to be transmitted, and after the display condition of the monitor is controlled depending on the decoded reference picture signal, the decoded picture signal is displayed on the monitor.

Furthermore, in the embodiments described above, the reference picture signal is generated at the image decoding apparatus 1, 21 or the image encoding apparatus 10, 30. However, the present invention is not only limited to this, but also as shown in FIGS. 5 and 6, the picture signal generated by the image encoding apparatus 10, 30 which is encoded by the predetermined encoding method, and the reference picture signal encoded by the same encoding method as that of said encoding method may be recorded on the recording medium 17, 37. In this case, the reference picture signal is recorded on the specified position of the recording medium. As this recording medium, various recording medium such as an optical disk, a magneto-optical disk, a magnetic tape and a semiconductor memory may be utilized.

In the case of displaying the picture signal recorded on this recording medium on the monitor, the image decoding apparatus reproduces the encoded picture signal and reference picture signal which have been recorded on the recording medium, and then decodes thus encoded and reproduced picture signal and reference picture signal. After the image decoding apparatus controls the display condition of the monitor depending on said decoded reference picture signal, the decoded picture signal is displayed on the monitor.

Accordingly, since the image decoding apparatus according to the present invention fetches the reference picture signal recorded on the recording medium and also the transmitted reference picture signal on the communication channel, controls the display condition of the monitor 5 depending on the reference picture signal, the display condition of the monitor can be set to the display condition in which the deterioration of picture quality would not be seen easily.

Furthermore, in the embodiments described above, the picture signal to show the brightness change in each brightness area is used as the reference picture signal. However, the present invention is not only limited to this, but also the picture signal to show the color change may be used.

Moreover, in the embodiments described above, the reference picture signal is stored in the memory 2, 22, 11, 31. However, the present invention is not only limited to this but also the memory to store the reference picture signal may be used in common with the memory in the decoder 4, 24 and the encoder 13, 33.

Furthermore, in the embodiments described above, the control signal is inputted to the selector 3, 23, 12, 32 and the reference picture signal is selected at the predetermined timing at the time when the user demands from the outside. However, the present invention is not only limited to this but also the control signal may be inputted automatically to the selector 3, 23, 12, 32 at the initial setting time when the power source is inputted and the reference picture signal may be selected at the predetermined timing In this case, since the control signal is outputted automatically, the workload for the user can be decreased.

Moreover, in the embodiments described above, the picture signal to display the brightness change as reference picture signal is used. However, the present invention is not only limited to this but also the control signal to display images by means of on screen display system may be used as the reference picture signal in the case where the image decoding apparatus 1, 21 is equipped with the on screen display system In this case the control signal is stored in the memory 2, 22 of the image decoding apparatus 1, 21.

Furthermore, in the embodiments described above, the picture signal to display the brightness change as reference picture signal is used. The present invention is not, however, only limited to this but also the control signal to display images by means of on screen display system may be used as the reference picture signal in the case where the image decoding apparatus is equipped with the on screen display system In this case this control signal is stored in the memory 11, 31 of the image encoding apparatus 10, 30, and further stored as data in the user data area of image sequence, for example.

Furthermore, in the embodiments described above, the encoded reference picture signal is added and outputted to the head of the encoded picture signal However, the present invention is not only limited to the above but also the reference picture signal may be outputted as an independent image sequence.

Furthermore, in the embodiments described above, the picture signal of which display content is shown in FIG. 3 as the reference picture signal. However, the present invention is not only limited to this but also the picture signal having other display content may be used.

As described above, the present invention selects the reference picture signal to be generated from the reference picture signal generating means by the selecting means at the predetermined timing and decodes by the decoding means. The present invention, in case of displaying the picture signal decoded by the decoding means on the displaying means, after controls the display condition of the displaying means depending on the decoded reference picture signal, displays the decoded picture signal on the displaying means. Thereby, in the present invention, the effect that the display condition of the displaying means can be set to the display condition in which the deterioration of picture quality would not be easily seen can be obtained.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. An apparatus for decoding a picture signal encoded by a predetermined encoding method, said apparatus comprising:

means for receiving the picture signal which is encoded by said predetermined encoding method;

means for decoding said received encoded picture signal by a decoding method corresponding to said predetermined encoding method;

means for producing a reference picture signal representative of one of a plurality of reference luminance areas and a plurality of reference color areas to be displayed for visual observation by an operator so as to enable said operator to control a display condition of a decoded picture signal, in which each of the plurality of reference luminance or color areas has a substantially rectangular shape and wherein said reference picture signal is produced without directly or indirectly utilizing any of the picture signal, the encoded picture signal, and the decoded picture signal; and means for displaying said reference picture signal without displaying any of the picture signal, the encoded picture signal, and the decoded picture signal so as to provide a display representative of only the plurality of substantially rectangular shaped reference luminance areas or the plurality of substantially rectangular shaped reference color areas so as to enable said operator to control the display condition by adjusting one or more variable parameters to a desired level or levels so as to change luminance or color levels in the reference luminance or color areas and set the display condition to a desired display condition in accordance with the changed level or levels and for displaying said decoded picture signal without said reference picture signal after control of said display condition has been performed.

2. An apparatus for encoding an inputted picture signal by a predetermined encoding method, said apparatus comprising:

means for receiving a picture signal;

means for encoding said received picture signal by said predetermined encoding method;

means for producing a reference picture signal representative of one of a plurality of reference luminance areas and a plurality of reference color areas to enable an operator to control a display condition of a picture signal, in which each of the plurality of reference luminance or color areas has a substantially rectangular shape and wherein said reference picture signal is produced without directly or indirectly utilizing any of the picture signal and the encoded picture signal; and means for selecting said encoded picture signal and said reference picture signal;

wherein said reference picture signal is adaptable to be displayed for observation by an operator without displaying any of the picture signal and the encoded picture signal so as to provide a display representative of only the plurality of substantially rectangular shaped reference luminance areas or the plurality of substantially rectangular shaped reference color areas so as to enable said operator to change luminance or color levels in the reference luminance or color areas and to set the display condition to a desired display condition in accordance with the changed level or levels so as to control the display condition of said picture signal.

3. An apparatus for decoding a picture signal encoded by a predetermined encoding method, said apparatus comprising:

receiving means for receiving the picture signal which is encoded by said predetermined encoding method;

reference picture signal producing means for producing a reference picture signal representative of one of a plurality of reference luminance areas and a plurality of reference color areas to enable an operator to control a display condition of a decoded picture signal, in which each of the plurality of reference luminance or color areas has a substantially rectangular shape and wherein said reference picture signal is produced without directly or indirectly utilizing any of the picture signal and the encoded picture signal and is encoded by said predetermined encoding method;

selecting means for selecting said received encoded picture signal and said reference picture signal at a predetermined timing;

decoding means for decoding said encoded picture signal and said reference picture signal from said selecting means by a decoding method corresponding to said predetermined encoding method; and means for displaying the decoded reference picture signal without displaying any of the picture signal, the encoded picture signal, and the decoded picture signal so as to provide a display representative of only the plurality of substantially rectangular shaped reference luminance areas or the plurality of substantially rectangular shaped reference color areas, for enabling said operator to change luminance or color levels in the reference luminance or color areas and to set the display condition to a desired display condition in accordance with the changed level or levels, and for displaying said decoded picture signal without said decoded reference picture signal after the display condition has been set.

4. An apparatus for decoding a picture signal encoded by a predetermined encoding method, said apparatus comprising:

receiving means for receiving the picture signal which is encoded by said predetermined encoding method;

decoding means for decoding said received encoded picture signal by a decoding method corresponding to said predetermined encoding method;

reference picture signal producing means for producing a reference picture signal representative of one of a plurality of reference luminance areas and a plurality of reference color areas to be displayed for visual observation by an operator so as to enable said operator to control a display condition of the decoded picture signal, in which each of the plurality of reference luminance or color areas has a substantially rectangular shape and wherein said reference picture signal is produced without directly or indirectly utilizing any of the picture signal, the encoded picture signal, and the decoded picture signal;

selecting means for selecting said decoded picture signal and said reference picture signal at a predetermined timing; and means for displaying said reference picture signal without displaying any of the picture signal, the encoded picture signal, and the decoded picture signal so as to provide a display representative of only the plurality of substantially rectangular shaped reference luminance areas or the plurality of substantially rectangular shaped reference color areas, for enabling said operator to change luminance or color levels in the reference luminance or color areas and to set the display condition to a desired display condition in accordance with the changed level or levels, and for displaying said decoded picture signal without said reference picture signal after the display condition has been set.

5. An apparatus for encoding an inputted picture signal by a predetermined encoding method, said apparatus comprising:

receiving means for receiving a picture signal;

reference picture signal producing means for producing a reference picture signal representative of one of a plurality of reference luminance areas and a plurality of reference color areas to enable an operator to control a display condition of a picture signal, in which each of the plurality of reference luminance or color areas has a substantially rectangular shape and wherein said reference picture signal is produced without directly or indirectly utilizing the received picture signal;

selecting means for selecting said received picture signal and said reference picture signal at a predetermined timing; and encoding means for encoding said picture signal and said reference picture signal from said selecting means by said encoding method;

wherein a decoded reference picture signal corresponding to said encoded reference picture signal is adaptable to be displayed for observation by an operator without displaying any of the picture signal, the encoded picture signal, and a decoded picture signal so as to provide a display representative of only the plurality of substantially rectangular shaped reference luminance areas or the plurality of substantially rectangular shaped reference color areas so as to enable said operator to change luminance or color levels in the reference luminance or color areas and to set the display condition to a desired display condition in accordance with the changed level or levels so as to control the display condition of said picture signal.

6. The apparatus according to claim 5, wherein said reference picture signal is added to the head of said encoded picture signal.

7. An apparatus for encoding an inputted picture signal by a predetermined encoding method, said apparatus comprising:

receiving means for receiving a picture signal;

encoding means for encoding said received picture signal by said predetermined encoding method;

reference picture signal producing means for producing a reference picture signal representative of one of a plurality of reference luminance areas and a plurality of reference color areas to enable an operator to control a display condition of a picture signal, in which each of the plurality of reference luminance or color areas has a substantially rectangular shape and wherein said reference picture signal is produced without directly or indirectly utilizing any of the picture signal and said encoded picture signal and is encoded by said predetermined encoding method; and selecting means for selecting said encoded picture signal and said reference picture signal at a predetermined timing;

wherein a decoded reference picture signal corresponding to said encoded reference picture signal is adaptable to be displayed for observation by an operator without displaying any of the picture signal, the encoded picture signal, and a decoded picture signal so as to provide a display representative of only the plurality of substantially rectangular shaped reference luminance areas or the plurality of substantially rectangular shaped reference color areas so as to enable said operator to change luminance or color levels in the reference luminance or color areas and to set the display condition to a desired display condition in accordance with the changed level or levels so as to control the display condition of said picture signal.

8. The apparatus according to claim 7, wherein said reference picture signal is added to the head of said encoded picture signal.

9. A method for transmitting a picture signal encoded by a predetermined encoding method, said method comprising the steps of:

receiving a picture signal;

producing a reference picture signal representative of one of a plurality of reference luminance areas and a plurality of reference color areas to enable an operator to control a display condition of a picture signal, in which each of the plurality of reference luminance or color areas has a substantially rectangular shape and wherein said reference picture signal is produced without directly or indirectly utilizing the received picture signal;

selecting said received picture signal and said reference picture signal at a predetermined timing;

encoding said picture signal and said reference picture signal by said encoding method; and selectively transmitting said encoded picture signal and said encoded reference picture signal;

wherein a decoded reference picture signal corresponding to said encoded reference picture signal is adaptable to be displayed for observation by an operator without displaying any of the picture signal, the encoded picture signal, and a decoded picture signal so as to provide a display representative of only the plurality of substantially rectangular shaped reference luminance areas or the plurality of substantially rectangular shaped reference color areas so as to enable said operator to change luminance or color levels in the reference luminance or color areas and to set the display condition to a desired display condition in accordance with the changed level or levels so as to enable said operator to control the display condition of said picture signal.

10. The method according to claim 9, wherein said transmission step adds said reference picture signal to said encoded picture signal and transmits it.

11. A recording medium having recorded thereon a picture signal encoded by a predetermined method and an encoded reference picture signal representative of one of a plurality of reference luminance areas and a plurality of reference color areas to enable an operator to control a display condition of a picture signal at respective predetermined positions in which each of the plurality of reference luminance or color areas has a substantially rectangular shape, wherein said reference picture signal is produced without directly or indirectly utilizing any of the picture signal and the encoded picture signal and wherein a decoded reference picture signal corresponding to said recorded encoded reference picture signal is adaptable to be displayed for visual observation by said operator without displaying any of the picture signal, the encoded picture signal, and a decoded picture signal corresponding to the recorded encoded picture signal so as to provide a display representative of only the plurality of substantially rectangular shaped reference luminance areas or the plurality of substantially rectangular shaped reference color areas so as to enable said operator to change luminance or color levels in the reference luminance or color areas and to set the display condition to a desired display condition in accordance with the changed level or levels so as to control the display condition prior to displaying the decoded picture signal without said decoded reference picture signal.

12. A method for decoding a picture signal encoded by a predetermined encoding method, said method comprising the steps of:

receiving the picture signal which is encoded by said predetermined encoding method;

producing a reference picture signal representative of one of a plurality of reference luminance areas and a plurality of reference color areas to enable an operator to control a display condition of a decoded picture signal, in which each of the plurality of reference luminance or color areas has a substantially rectangular shape and wherein said reference picture signal is produced without directly or indirectly utilizing any of the picture signal and said encoded picture signal and is encoded by said predetermined encoding method;

selecting said received encoded picture signal and said reference picture signal at a predetermined timing;

decoding said encoded picture signal and said reference picture signal from said selection step by a decoding method corresponding to said predetermined encoding method; and displaying the decoded reference picture signal without displaying any of the picture signal, the encoded picture signal, and the decoded picture signal so as to provide a display representative of only the plurality of substantially rectangular shaped reference luminance areas or the plurality of substantially rectangular shaped reference color areas, enabling said operator to change luminance or color levels in the reference luminance or color areas and to set the display condition to a desired display condition in accordance with the changed level or levels, and displaying said decoded picture signal without said decoded reference picture signal after the display condition has been set.

13. A method for decoding a picture signal encoded by a predetermined encoding method, said method comprising the steps of:

receiving the picture signal which is encoded by said predetermined encoding method;

decoding said received encoded picture signal by a decoding method corresponding to said predetermined encoding method;

producing a reference picture signal representative of one of a plurality of reference luminance areas and a plurality of reference color areas to be displayed for visual observation by an operator so as to enable said operator to control a display condition of the decoded picture signal, in which each of the plurality of reference luminance or color areas has a substantially rectangular shape and wherein said reference picture signal is produced without directly or indirectly utilizing any of the picture signal, the encoded picture signal, and the decoded picture signal;

selecting said decoded picture signal and said reference picture signal at a predetermined timing; and displaying the reference picture signal without displaying any of the picture signal, the encoded picture signal, and the decoded picture signal so as to provide a display representative of only the plurality of substantially rectangular shaped reference luminance areas or the Plurality of substantially rectangular shaped reference color areas, enabling said operator to change luminance or color levels in the reference luminance or color areas and to set the display condition to a desired display condition in accordance with the changed level or levels, and displaying said decoded picture signal without said reference picture signal after the display condition has been set.

14. A method for encoding an inputted picture signal by a predetermined encoding method, said method comprising the steps of:

receiving a picture signal;

producing a reference picture signal representative of one of a plurality of reference luminance areas and a plurality of reference color areas to enable an operator to control a display condition of a picture signal, in which each of the plurality of reference luminance or color areas has a substantially rectangular shape and wherein said reference picture signal is produced without directly or indirectly utilizing the received picture signal;

selecting said received picture signal and said reference picture signal at a predetermined timing; and encoding said picture signal and said reference picture signal from said selection step by said encoding method;

wherein a decoded reference picture signal corresponding to said encoded reference picture signal is adaptable to be displayed for observation by an operator without displaying any of the picture signal, the encoded picture signal, and a decoded picture signal so as to provide a display representative of only the plurality of substantially rectangular shaped reference luminance areas or the plurality of substantially rectangular shaped reference color areas so as to enable said operator to change luminance or color levels in the reference luminance or color areas and to set the display condition to a desired display condition in accordance with the changed level or levels so as to enable said operator to control the display condition of said picture signal.

15. The method according to claim 14, wherein said reference picture signal is added to the head of said encoded picture signal.

16. A method for encoding an inputted picture signal by a predetermined encoding method, said method comprising the steps of:

receiving a picture signal;

encoding said received picture signal by said predetermined encoding method;

producing a reference picture signal representative of one of a plurality of reference luminance areas and a plurality of reference color areas to enable an operator to control a display condition of a picture signal, in which each of the plurality of reference luminance or color areas has a substantially rectangular shape and wherein said reference picture signal is produced without directly or indirectly utilizing any of the picture signal and said encoded picture signal and is encoded by said predetermined encoding method; and selecting said encoded picture signal and said reference picture signal at a predetermined timing;

wherein a decoded reference picture signal corresponding to the encoded reference picture signal is adaptable to be displayed for observation by an operator without displaying any of the picture signal, said encoded picture signal, and a decoded picture signal so as to provide a display representative of only the plurality of substantially rectangular shaped reference luminance areas or the plurality of substantially rectangular shaped reference color areas so as to enable said operator to change luminance or color levels in the reference luminance or color areas and to set the display condition to a desired display condition in accordance with the changed level or levels so as to so as to enable said operator to control the display condition of said picture signal.

17. The method according to claim 16, wherein said reference picture signal is added to the head of said encoded picture signal.

* * * * *